Oct. 11, 1932.  H. B. HERDEG  1,882,361
DEVICE FOR AUTOMATICALLY MAINTAINING ELECTROLYTE LEVEL IN A BATTERY
Filed Nov. 17, 1930  2 Sheets-Sheet 1
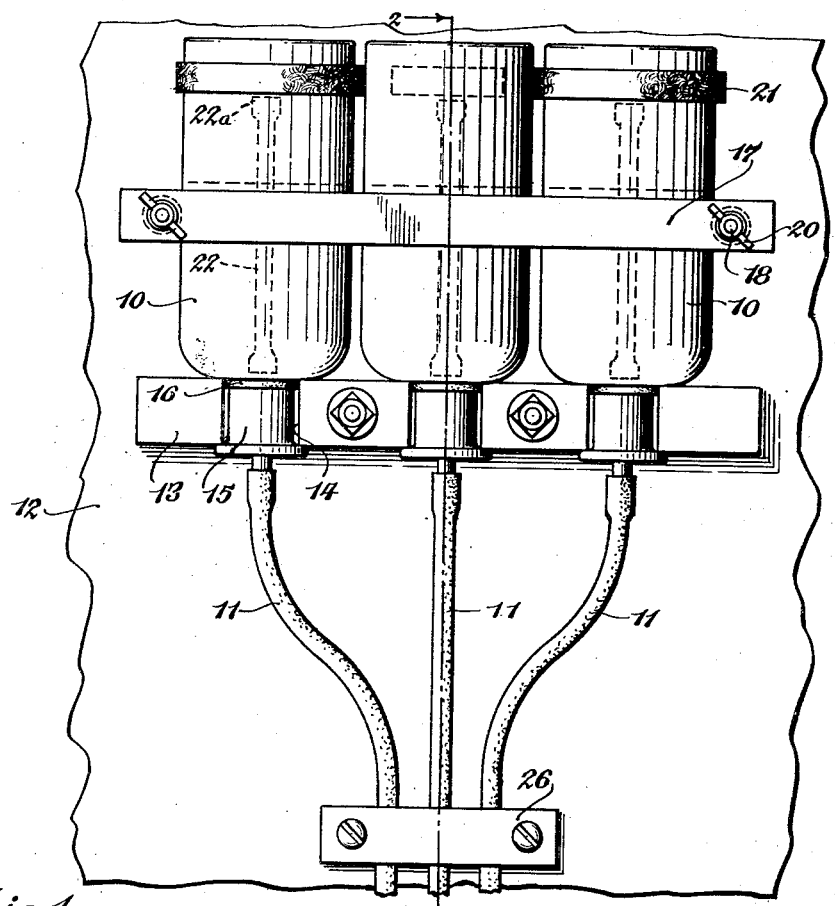
Fig.1.
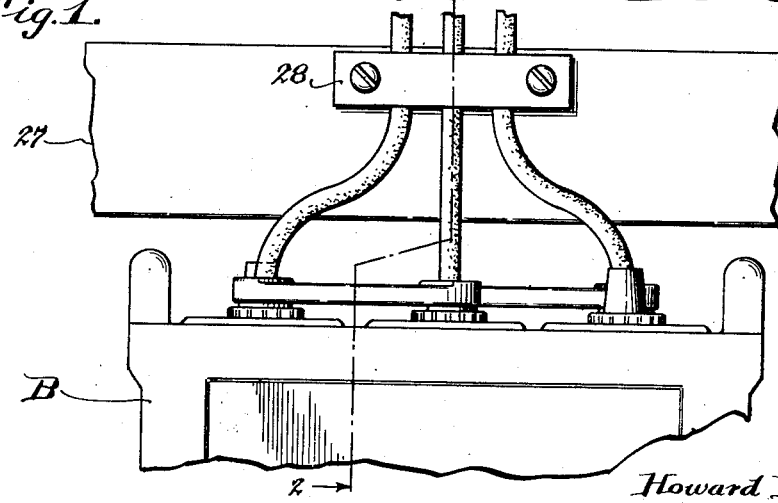
Inventor
Howard B. Herdeg
By Popp and Powers
Attorneys

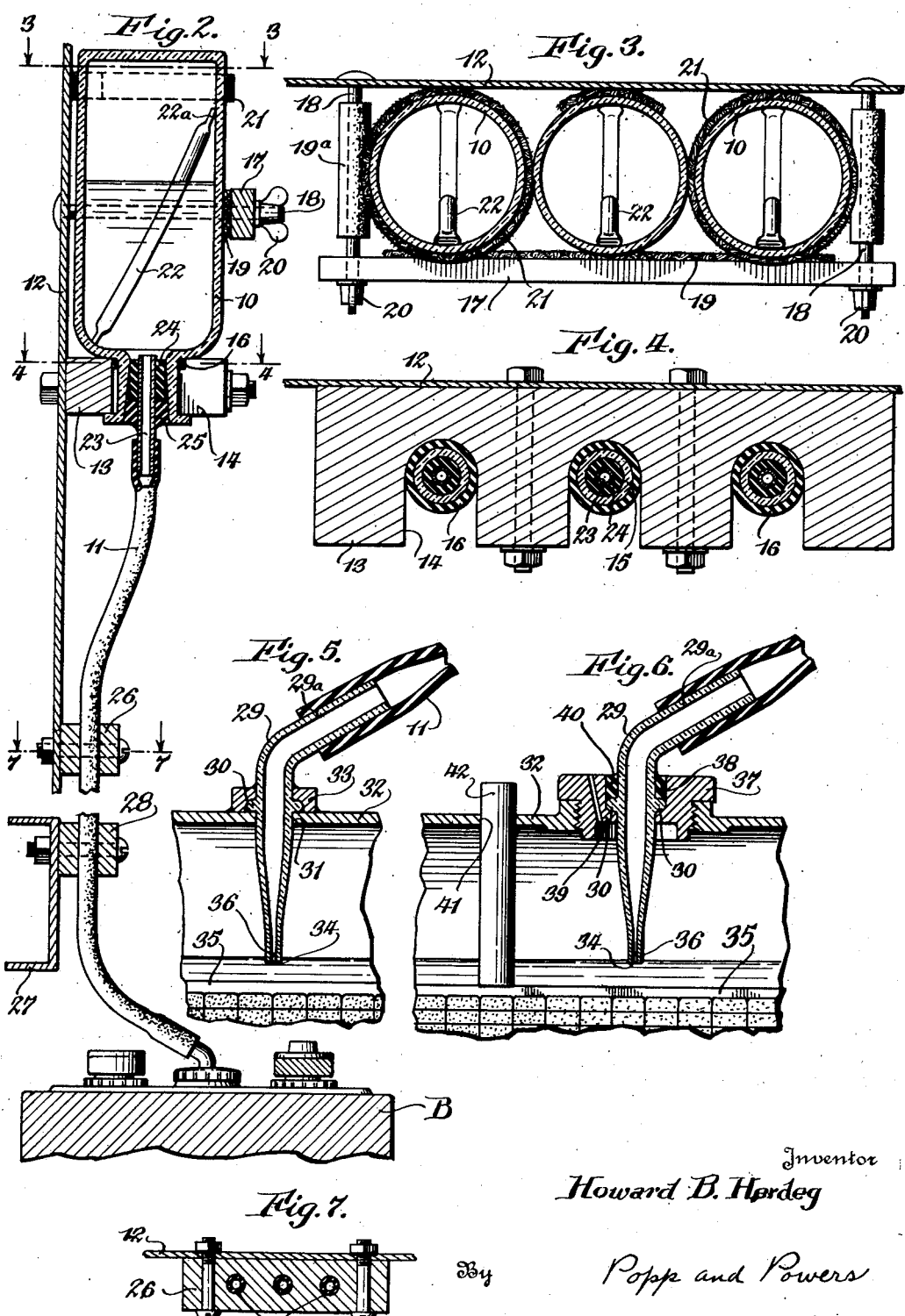

Patented Oct. 11, 1932

1,882,361

UNITED STATES PATENT OFFICE

HOWARD B. HERDEG, OF BUFFALO, NEW YORK

DEVICE FOR AUTOMATICALLY MAINTAINING ELECTROLYTE LEVEL IN A BATTERY

Application filed November 17, 1930. Serial No. 496,213.

This invention relates to a device for use in connection with a storage battery and is designed to maintain automatically the electrolyte in the cells of the battery at a predetermined height.

Although available for other uses, the invention has particular utility when associated with the storage battery of an automobile. When employed in this connection, a battery is usually supported from the chassis of the vehicle and in order to determine the height of the electrolyte in the various cells or to add distilled water to replace the liquid lost by evaporation or otherwise, it is necessary to remove various parts of the automobile. Thus, because of the inaccessibility of the battery, need of attention is often overlooked and the electrolyte in the cells is permitted to recede to such an extent that portions of the plates are uncovered.

The principal object of the present invention, therefore, is a device of the kind generally described which will supply distilled water, or other liquid, individually to the cells of the battery with which the device is associated at a rate sufficient to compensate for any loss of the electrolyte which may occur, thereby maintaining the latter at a predetermined height.

A further object is a device for this purpose which will function in the manner described but which will in no way interfere with testing of the specific gravity of the electrolyte in the various cells in the usual manner.

A still further object is a device which is operative under normal weather conditions.

The invention is illustrated in the accompanying drawings, in which:—

Figure 1 is a fragmentary view in elevation of a storage battery equipped, in accordance with my invention, with a device for maintaining automatically at a predetermined height the electrolyte in the cells.

Figure 2 is a vertical section taken along line 2—2 of Fig. 1.

Figure 3 is a section taken along line 3—3 of Fig. 2.

Figure 4 is a section taken along line 4—4 of Fig. 2.

Figure 5 is an enlarged fragmentary section of a battery and one of the feed tubes of the device.

Figure 6 is a similar view of a modified construction for supporting the feed tubes.

Figure 7 is a section taken along line 7—7 of Fig. 2.

The liquid which is to be supplied to the various cells of the battery B is preferably stored in a plurality of reservoirs, one for each cell of the battery. The invention is illustrated in connection with a three cell battery and the supply of distilled water, therefore, is contained in three receptacles or containers 10, each of which is in communication through a supply pipe 11 with a cell of the battery.

The supply containers are preferably mounted as a unit upon the dash 12 of the automobile, beneath the hood, in such a manner that they are readily accessible for removal for purposes of refilling. To this end, the said receptacles are supported in an inverted position upon a supporting block 13 which is suitably secured to the dash of the vehicle, the said block being cut away as at 14 to provide openings in which the necks 15 of the receptacles are positioned. In order to provide securement of the receptacles against vibration, a rubber washer 16 may be positioned about the necks of the receptacles and wedged between the latter and the adjacent sides of the openings 14. The receptacles are held firmly in this position by a cross bar 17 and co-operating bolts 18, the said cross bar and bolts carrying suitable cushioning material 19 and 19a respectively so that the receptacles may be engaged and held against vibration. The cross bar 17 is preferably secured in the manner described by wing nuts 20, whereby in order to remove one or more of the receptacles from the supporting block 13, it is only necessary to first remove the cross bar 17. The receptacles are held from contact with one another and with the dash 12 of the vehicle by suitable cushioning rings 21.

The receptacles 10 may be of any form or material desired. It is preferred, however, that they be of glass so that the height of the liquid in them will be readily apparent.

The use of glass is also desirable for the reason that the liquid is not chemically affected through contact with the walls of the receptacle. In order to enable the use of glass receptacles under all normal weather conditions I employ with each receptacle a rubber tube 22 vulcanized at either end as at 22a, the said tubes preferably being arranged within the receptacles as shown in Figure 2. During weather when the temperature is below freezing, the expansion of the liquid instead of being outwardly is in the direction of the center of the receptacle, such expansion being taken up by the tube 22, the walls of which are forced inwardly as the liquid expands. During this action, of course, the air within the tube is compressed.

In order to permit passage of the liquid from the receptacle to the cell of the battery with which it is in communication, each receptacle is provided with a glass tube 23 which is in communication with the cell of the battery through the pipe 11. The glass tube 23 is preferably supported at its inner end by a rubber washer 24, which fits tightly within the neck of the bottle. The said washer preferably occupies only the inner portion of the neck of the bottle and the remainder of the neck is filled by a compound 25, such as asphalt, which is designed to permanently seal the opening between the bottle neck and the tube 23.

At a short distance below the tube 23, the various supply pipes 11 are preferably supported in a common block 26 against the dash. Thus, during removal of any or all of the receptacles the supply lines beyond the block 26 are not disturbed. From the block 26, the supply pipes 11 lead in the shortest practical paths to the various cells of the battery. Adjacent the battery, the supply lines are preferably secured to an angular member 27 of the chassis, as by a block 28, similar to the block 26.

At their outer ends, the supply pipes 11 are connected to the cells of the battery by feed tubes 29 which are preferably of glass, the said tubes are bent at their upper ends as at 29a to extend angularly to meet the end of the pipes 11 so that no sharp bends are formed in the latter which might tend to interfere with the passage of the liquid. The feed tubes may be secured to the battery in any suitable manner. As shown in Figure 5, each tube is formed with an annular rib 30 by which it is supported in an opening 31 formed in the top wall 32 of the battery. A boss 33 of asphalt, or other suitable material, is formed upon the top wall of the battery about the tube 29 over the rib 30 thereby securing the tube firmly to the said wall. The rib 30 is formed upon the tube 29 at such a point in its extent that with the rib 30 engaging the top wall 32, the tip 34 of the tube extends to a point above the plates 35 of the battery to which it is desired the height of the electrolyte be maintained. As illustrated, the passages provided by the feed tubes diminish in diameter gradually toward the tips 34, the passage or mouth 36 at this point being restricted to such an extent that liquid will not pass through it into the cell of the battery, assuming the level of the electrolyte has receded below the tip, unless certain conditions exist which will be hereinafter described. It is to be understood, of course, that in the operation of the device any liquid which enters the cell of the battery must be replaced by a corresponding quantity of air in the receptacle 10.

In accordance with the invention the mouth 36 of the tube 29 is so restricted that in order for liquid to leave the tube 29 and enter the cell of the battery not only must the level of the electrolyte be below the tip 34 but there must also be movement of the vehicle to assist in the discharge of liquid from the tube 29 with air replacement for the same in the receptacle. The utilization of the movement of the vehicle in this manner has a number of advantages. If the mouth 36 of the feed tube was of such a size that liquid from the receptacle would enter the cell of the battery as soon as the level of the electrolyte receded below the tip 34, then during the operation of the vehicle liquid would be supplied to the cell at intervals during which the electrolyte would be washed from one side of the cell to the other as the vehicle passed over depressions in the road bed. In other words, the liquid would be supplied to the cell when in reality it was not needed. However, a more important advantage results from the use of a feed tube constructed in this manner. Although the level of the electrolyte may be maintained at a predetermined level in the manner described it is nevertheless necessary, at intervals, to test the specific gravity of the electrolyte. When this is done in the usual manner, a relatively large quantity of electrolyte is removed from the cell by the hydrometer for testing and unless provision were made for this, the feed tube 29 would immediately replace the liquid taken temporarily from the cell for the purpose of determining the specific gravity in the cell. Thus, the specific gravity would be reduced by the withdrawal of a quantity of electrolyte, the latter being replaced by distilled water. If the electrolyte which has been used for testing purposes is returned to the cell, then there is a possibility of raising the level of the electrolyte beyond the height desired. The restricted mouth of the feed tube has the further advantage of preventing diffusion of the electrolyte into the body of liquid which constitutes the supply.

From the foregoing, it will be apparent that in the operation of the device liquid will not be supplied to the cells of the battery during operation of the vehicle, as the electrolyte is washed about in the cells, unless the electrolyte has receded to a point which is below the predetermined level. In other words, not only must the height of the electrolyte be below the predetermined level but the vehicle must be in motion. The cells, therefore, may be tested in the usual manner, during which the device will not function thereby enabling the return to the cell of the electrolyte which has been withdrawn for testing purposes.

The storage receptacles may be conveniently refilled through their tubes 23 after they have been first detached from the dash. The supply pipes 11 are preferably of rubber and they may be readily removed from the tubes 23. Care should be taken, however, during this operation to prevent air from being admitted into the pipe which would result, of course, in the drainage of the pipes into their respective cells.

A modified construction is shown in Figure 6 in which the feed tubes 29 are mounted in the filler caps 37 of the battery. In this embodiment each of the caps 37 is formed to support the tip 34 of the tube at the desired point in the battery. To this end, the rib 30 of the tube is supported in an opening 38 of the cap which is restricted at its bottom to provide an annular shoulder 39 upon which the rib 30 rests. The tube is secured in the cap by a filling of asphalt 40 or the like. In this construction, it is preferred that an opening 41 be formed in the top 32 of the battery adjacent the cap 37 so that the electrolyte in the cell may be withdrawn for testing. This opening may be closed in any suitable manner as by a glass plug 42 which rests upon its bottom on the plates 35.

It will be apparent that the device is simple in construction and functions to maintain the electrolyte in the individual cells at a predetermined level under all normal weather conditions and that liquid is supplied to the various cells of the battery only when needed.

I claim as my invention:

1. In a device for automatically supplying liquid to the cell of a battery to maintain the electrolyte therein at a predetermined height, the combination of a receptacle for containing a supply of the liquid and a feed tube in communication with the receptacle and extending into the cell of the battery to a point substantially at the level at which the electrolyte is to be maintained, said tube being formed to supply liquid to the cell only after the level of the electrolyte has receded below the end of said tube and then only during vibratory movements of said battery.

2. In a device for automatically supplying liquid to the cell of a battery of a vehicle to maintain the electrolyte at a predetermined height, the combination of a receptacle for containing a supply of the liquid, and a feed tube in communication with said receptacle, said tube being formed to supply liquid to the cell only after the level of the electrolyte has receded to a predetermined point and then only during movement of the battery occasioned by movement of the vehicle.

3. In a device for automatically supplying liquid to the cell of a battery of a vehicle to maintain the electrolyte at a predetermined height therein, the combination of a receptacle for containing a supply of the liquid and a feed tube in communication with said supply, said feed tube extending into the cell of the battery to a point substantially at the level at which the electrolyte is to be maintained and being formed to supply liquid to the cell only after the level of the electrolyte has receded to a point below the end of said tube and then only while the battery is being subjected to vibratory movement occasioned by movement of the vehicle.

In testimony whereof I affix my signature.

HOWARD B. HERDEG.